United States Patent [19]

Terajima

[11] Patent Number: 5,270,607
[45] Date of Patent: Dec. 14, 1993

[54] VIBRATION CONTROL APPARATUS

[75] Inventor: Kokichi Terajima, Tokyo, Japan

[73] Assignee: Akai Electric Co., Ltd., Tokyo, Japan

[21] Appl. No.: 894,017

[22] Filed: Jun. 6, 1992

[30] Foreign Application Priority Data

| Jun. 7, 1991 [JP] | Japan | 3-162329 |
| Jun. 7, 1991 [JP] | Japan | 3-162330 |
| Jun. 7, 1991 [JP] | Japan | 3-162331 |

[51] Int. Cl.$^5$ .................................... H01L 41/08
[52] U.S. Cl. .................................... 310/316; 310/321; 73/505
[58] Field of Search ............... 310/321, 323, 324, 366, 310/328, 329, 316, 317, 319; 73/505, 517 R, 517 B, 517 AV; 356/350; 318/116

[56] References Cited

U.S. PATENT DOCUMENTS

| 3,520,195 | 7/1970 | Tehon | 73/505 |
| 3,967,143 | 6/1976 | Watanabe et al. | 310/316 |
| 4,193,010 | 3/1980 | Kompanek | 310/321 X |
| 4,406,965 | 9/1983 | Ljung | 310/319 |
| 4,489,609 | 12/1984 | Burdess et al. | 73/505 |
| 4,692,649 | 9/1987 | Izukawa et al. | 310/316 |
| 4,709,360 | 11/1987 | Martin et al. | 310/316 X |
| 4,740,726 | 4/1988 | Umezawa | 310/316 |
| 4,780,062 | 10/1988 | Yamada et al. | 310/321 X |
| 4,833,358 | 5/1989 | Suzuki et al. | 310/316 |
| 4,879,528 | 11/1989 | Gotanda | 310/316 X |
| 5,061,882 | 10/1991 | Takagi | 318/116 |
| 5,117,148 | 5/1992 | Nakamura et al. | 310/366 X |

FOREIGN PATENT DOCUMENTS

| 3926504 | 2/1990 | Fed. Rep. of Germany . |
| 2096135 | 2/1972 | France . |
| 61142415 | 12/1984 | Japan . |
| 2266214 | 4/1989 | Japan . |
| 2266215 | 4/1989 | Japan . |

OTHER PUBLICATIONS

W. D. Gates, "Vibrating angular rate sensor may threaten the gyroscope", Electronics, vol. 41, No. 10, pp. 131-134.

"Angular rate sensor", Sensor Device Handbook, No. 14, 1983, pp. 193-194 edited by Information Group of Journal of Sensor Technology.

Primary Examiner—Mark O. Budd
Attorney, Agent, or Firm—Meltzer, Lippe, Goldstein, Wolf, Schlissel & Sazer

[57] ABSTRACT

A vibration control apparatus comprises a vibration member having a surface with a resonance point. A piezoelectric element is adhered to the surface of the vibration member. A drive apparatus is connected to the piezoelectric element via an impedance element for exciting the piezoelectric element with an A.C. signal. A feedback circuit is connected between the piezoelectric element and the drive apparatus. The feedback circuit picks out the components of a voltage on the piezoelectric element caused by a strain of the piezoelectric element and feeds this voltage back to control the drive apparatus. The inventive vibration control apparatus may be incorporated in a gyro to simplify the construction of the gyro.

16 Claims, 5 Drawing Sheets

VIBRATION CONTROL APPARATUS

FIELD OF THE INVENTION

The present invention relates to a vibration control apparatus, for use, for example, in a vibration gyroscope. In particular, the invention relates to a vibration control apparatus that offers a constantly stabilized self-induced vibration in a vibrator element that is excited using a piezoelectric element. In addition, the functions of drive, feedback and detection are performed in a vibration gyro using only one or only a single pair of piezoelectric elements.

BACKGROUND OF THE INVENTION

A prior art vibration control apparatus using two piezoelectric elements is illustrated in FIG. 1.

In FIG 1, vibrator 4 comprises drive piezoelectric element 2 and feedback piezoelectric element 3 which are both adhered onto one surface of vibration member 1. The output of drive apparatus 5 is supplied directly to drive piezoelectric element 2 while the output of feedback piezoelectric element 3 is fed back directly to drive apparatus 5 so as to form a vibration control apparatus that provides a constantly stabilized self-induced vibration to vibrator 4.

With prior technology of this sort, the work of assembling vibrator 4 is troublesome because it is necessary to adhere at least the drive and feedback piezoelectric elements 2 and 3 to vibration member 1. In addition, the vibration created by drive piezoelectric element 2 is transmitted to vibration member 1 via adhesive layer 6 used for the piezoelectric element 2, after which feedback output is provided through adhesive layer 7 used for feedback piezoelectric element 3. This leads to problems of unstable vibration in vibrator 4 because it is easily affected by the characteristic differences between these two piezoelectric elements 2 and 3 and by the temperature dependence of these adhesive layers 6 and 7.

It is an object of the present invention to effectively resolve such problems of prior technology by providing a vibration control apparatus that is simple to assemble and is capable of providing a constantly stabilized self-induced vibration to the vibrator.

An important application of a vibration control apparatus of the type discussed above is to a vibration gyroscope or gyro. Prior art vibration gyros which incorporate vibration control apparatus are shown as block diagrams in FIG. 2 and FIG. 3.

The vibration gyro shown in FIG. 2 comprises drive piezoelectric element 8 adhered to a first surface of vibration member 1 that is rectangular in cross-section, with feedback piezoelectric element 9 adhered to the surface opposite the first surface. The detector piezoelectric elements 10 and 11 are adhered to two more surfaces at right angles to the others to make vibrator 4. By supplying output from drive apparatus 5 to drive piezoelectric element 8 while feeding back output from feedback piezoelectric element 9 to drive apparatus 5, vibrator 4 gives a prescribed self-induced vibration in the direction of axis X in an orthogonal three-dimensional coordinate system.

Under such self-induced vibration, when vibrator 4 is rotated around axis Z, vibration is induced in the Y axis direction by the Coriolis force, and voltages accompanying this vibration in the Y axis direction are formed respectively in detection piezoelectric elements 10 and 11. These voltages are transmitted successively through differential amplifier 12, synchronous detector 13 and direct current amplifier 14 so as to obtain an indication of the angular velocity of vibrator 4 as the output of the amplifier 14.

An alternative prior art vibration gyro is illustrated in FIG. 3. The vibration gyro shown in FIG. 3 includes vibrator 4 for self-induced vibration in the X axis direction. This vibration is driven by the drive piezoelectric elements 15 and 16 which are adhered respectively to two surfaces of vibration member 1 that is triangular in cross-section. The feedback piezoelectric element 17 is adhered to another surface. The output from feedback piezoelectric element 17 is fed to drive apparatus 5. The feedback piezoelectric element 17 controls the output from drive apparatus 5 to drive piezoelectric elements 15 and 16 respectively via resistances 18 and 19. The drive piezoelectric elements 15 and 16 also serve as detection piezoelectric elements. The voltages formed by the piezoelectric elements 15 and 16 are differentially amplified by the differential amplifier 12. The output of the differential amplifier 12 is processed by the synchronous detector 13 and amplified by the D.C. amplifier 14. At the output of the amplifier 14, it is possible to detect the Coriolis force in the Y axis direction generated by vibrator 4 being rotated around axis Z, that is, to detect the angular velocity.

With the vibration gyro shown in FIG. 2, the respective piezoelectric elements 8, 9, 10 and 11 are all adhered to vibration member 1 by epoxy resin or other adhesives, creating problems in lack of stability in the self-induced vibration of vibrator 4 because of variations in vibration conditions caused by changes in the strength, elasticity and other properties of the adhesives brought about by changes, for example, in ambient temperature. Such problems may also result from the characteristic differences between drive piezoelectric element 8 and feedback piezoelectric element 9. There are also problems of variations in adhesive properties over time that cause hysteresis in drive conditions, and problems originating from variations in adhesive strength of the detection piezoelectric elements 10 and 11.

Also, variations in the properties of the several piezoelectric elements 8, 9, 10 and 11 and asymmetry in the sectional shape of vibration member 1 cause so-called offset voltages to occur because vibration in the Y axis direction, that does not occur ideally when vibrator 4 is not rotating, does occur in actuality. The size and other features of this offset voltage also change depending on the drive voltage and other drive conditions.

Also in the case of this prior technology it is necessary to adhere each piezoelectric element to each surface of vibration member 1 with high precision, causing troublesome problems in assembly labor for vibrator 4.

With the prior technology shown in FIG. 3, drive piezoelectric elements 15 and 16 are also used as detection piezoelectric elements, making it possible to decrease the changes in offset voltage brought about by changes in the adhesive under the prior technology shown in FIG. 2. However, even with this prior technology there still remains problems similar to those described above relative to vibration conditions because feedback piezoelectric element 17 is still furnished separately in the same manner as in FIG. 2.

It is a further object of the present invention to resolve such problems of prior technology by providing a vibration gyro that makes vibrator assembly work easy, and that is capable of effectively decreasing variations in drive conditions from the effect of adhesives and capable of controlling changes in offset voltages to a satisfactorily small level.

SUMMARY OF THE INVENTION

In an illustrative embodiment, the present invention is directed to a vibration control apparatus. The vibration control apparatus comprises a vibration member having a surface with a resonance point. A piezoelectric element is attached to the surface of the vibration member with the resonance point. A drive apparatus is connected via an impedance element to the piezoelectric element to drive the piezoelectric element with an AC drive voltage. A feedback circuit is connected between the piezoelectric element and the drive apparatus to control the drive apparatus. The feedback circuit includes, for example, a differential amplifier, for differentiating between the output voltage of the impedance element (or equivalently, the voltage obtained at the connection between the piezoelectric element and the impedance element) and an AC reference voltage, which reference voltage is illustratively generated from the drive voltage, so as to generate a control voltage for the drive apparatus.

The piezoelectric element produces strain when stress is applied to it. The piezoelectric effect produces an electric displacement that is proportional to the stress. On the other hand, when an electric field is applied thereto, an electric displacement is produced and an inverse piezoelectric effect produces a strain that is proportional to the electric field.

Consequently, when an alternating current charge is applied to the piezoelectric element by means of an impedance element, a voltage is observed in the connection between the piezoelectric element and the impedance element that is made up of the impressed alternating current voltage and the voltage that accompanies the strain of the piezoelectric element. The feedback circuit serves to separate out the voltage related to the strain of the piezoelectric member and returns this voltage to the drive apparatus to control the drive apparatus.

With this vibration control apparatus, the dual functions of drive and feedback are provided using a single piezoelectric element adhered to one surface of the vibration member. The single piezoelectric element causes strain and thus vibration in the vibrator by means of the piezoelectric effect of the piezoelectric element. The voltage produced by the inverse piezoelectric effect of the piezoelectric element is separated from the combined voltage present at the connection between the piezoelectric element and the impedance element by the feedback circuit. Because of this, the inventive apparatus is capable of making it easier to assemble the vibrator as compared to the case when a plurality of piezoelectric elements are adhered to the vibration member. The inventive apparatus also makes it possible to carry out stabilized self-induced vibration in the vibrator by efficiently removing the effects of differences in characteristics between piezoelectric elements and effects such as physical changes in the adhesive layers.

The vibration control apparatus may be incorporated in a vibration gyro. In one embodiment, the vibration gyro of this invention comprises a single piezoelectric element which is adhered to one surface of a vibration member that is polygon-shaped in cross-section. A vibrator is formed by splitting at least the electrode of the piezoelectric element (and possibly also the piezoelectric element itself) into first and second parts in the direction of vibration member width. Each split electrode of the vibrator is connected with a single drive apparatus via corresponding impedance elements. A feedback circuit connects the split electrodes back to the drive apparatus. The feedback circuit comprises, for example 1) an adder for adding the output voltages of the impedance elements (or equivalently the voltages in the connections between the split electrodes and the corresponding impedance elements) and a differential amplifier that performs differential amplification of the resulting sum with a reference alternating current voltage, or
2) first and second differential amplifiers for differentially amplifying the output voltages of the impedance elements and first and second reference A.C. voltages, and an adder for adding the outputs of the differential amplifiers.

Each A.C. reference voltage is the voltage of a connection between an impedance element and a capacitive element that connects to the drive apparatus via the impedance element.

When stress is applied to a piezoelectric element it causes strain and an electric displacement forms that is proportional to the stress because of the piezoelectric effect. When an electric field is applied, the strain that occurs with the electric displacement is proportional to the electric field because of the inverse piezoelectric effect. Consequently when an A.C. voltage is applied to the piezoelectric element via an impedance element, a voltage is detected at the connection between the piezoelectric element and the impedance element that is a combination of the alternating current voltage applied and the voltage created by the strain of the piezoelectric element. The feedback circuit separates out the voltages related to strain and uses the separated voltage to control the drive apparatus.

With the vibration gyro of the present invention, the three functions of drive, feedback and detection are performed by a single piezoelectric element by means of separating and removing the voltages created by the strains in each direction of the piezoelectric element.

By these means the vibration gyro of the present invention can decrease the effects of adhesives on drive conditions, can control hysteresis in drive conditions even when there are temperature cycles present, and can suppress changes in offset voltage to satisfactorily small amounts. Further, the vibration gyro of the present invention can make vibrator assembly work very quick and easy because only a single piezoelectric element is adhered.

In an alternative embodiment, the vibration gyro of the present invention comprises a first piezoelectric element adhered to a first surface of a vibration member that is polygon-shaped in cross-section and a second piezoelectric element adhered to a second surface of the vibration member that is not parallel to the first surface. A drive apparatus is connected to the first and second piezoelectric elements via first and second impedance elements. A feedback circuit connects the piezoelectric elements back to the drive apparatus to control the drive apparatus. There are several embodiments for the feedback circuit.

1) The feedback circuit comprises an adder for adding the output voltages of the first and second impedance elements and a differential amplifier that differentially amplifies the difference between the adder output and a reference A.C. voltage. The gyro output is obtained by a differential amplifier whose inputs are the output voltages of the two impedance elements.

2) The feedback circuit comprises a first differential amplifier for differentially amplifying the output voltages of first and second impedance elements, and a second differential amplifier for differentially amplifying the output of the first differential amplifier and a reference A.C. voltage. The gyro output is obtained using an adder which adds the output voltages of the first and second impedance elements.

3) The feedback circuit comprises first and second differential amplifiers for differentially amplifying the output voltages of the first and second impedance elements with respect to first and second reference A.C. voltages and an adder for adding the outputs of the first and second differential amplifiers. The gyro output is obtained using a third differential amplifier which differentially amplifies the output voltages of the first and second impedance elements. Alternatively, the gyro output may be obtained by differentially amplifying the outputs of the first and second differential amplifiers.

When stress is applied to a piezoelectric element a strain is produced and an electric displacement that is proportional to the stress is created by the piezoelectric effect. On the other hand when an electric field is applied, an electric displacement is created and a strain is produced that is proportional to the electric field by an inverse piezoelectric effect. Consequently, when an alternating current voltage is applied to the piezoelectric element via an impedance element, a voltage is observed at the output of the impedance element (or equivalently at the connection between the piezoelectric element and the impedance element) that is a combination of the applied alternating current voltage and the voltage that accompanies the strain of the piezoelectric element.

With this embodiment of the vibration gyro of the present invention, self-induced vibration is imparted to the vibrator by the impression of alternating current voltage on a pair of piezoelectric elements adhered to two surfaces of the vibration member that are not mutually parallel. By separating according to strain direction and extracting the voltages produced with the strain in each direction through use of the feedback circuit, the three functions of drive, feedback and detection are performed using only a pair of piezoelectric elements.

Because of this, this embodiment of the vibration gyro of the present invention can decrease the effects that the adhesive has on vibration conditions and drive conditions, can impart stable self-induced vibration to the vibration member, can suppress hysteresis in drive conditions even when temperature cycles are present, and can suppress changes in offset voltage to sufficiently small amounts. Further, the vibration gyro of the present invention makes it possible to perform the work of assembling the vibrator very quickly and easily because it adheres only one pair of piezoelectric elements to the vibration member.

DETAILED DESCRIPTION OF THE INVENTION

Figure 1:
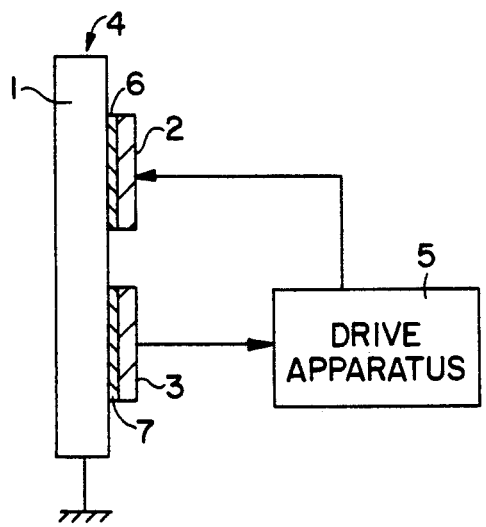
FIG. 1 illustrates a prior art vibration control apparatus.
Figure 2:
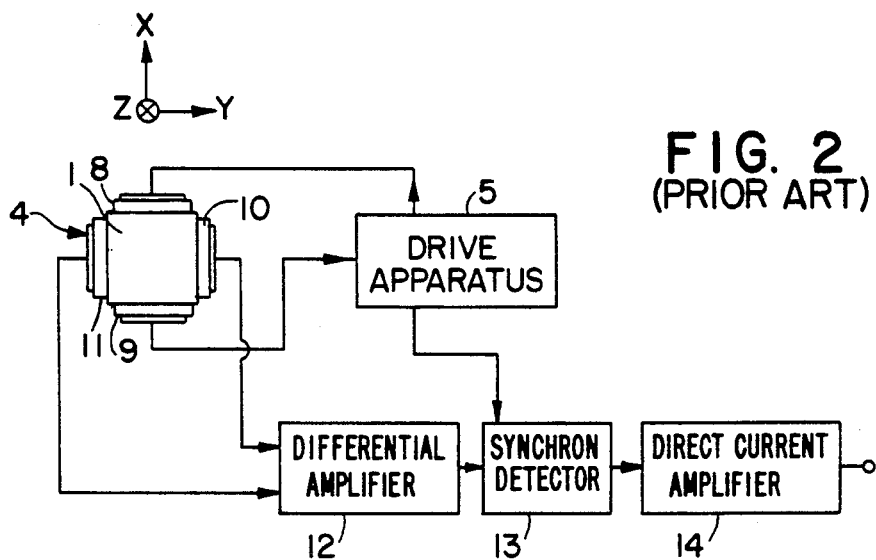
FIG. 2 and FIG. 3 illustrates prior art gyros.
Figure 3:
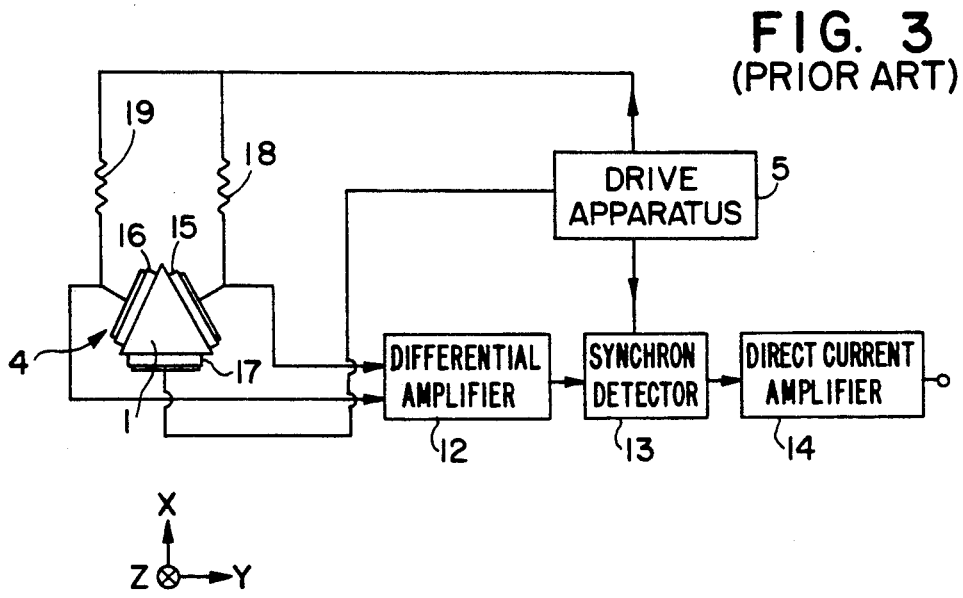
Figure 4:
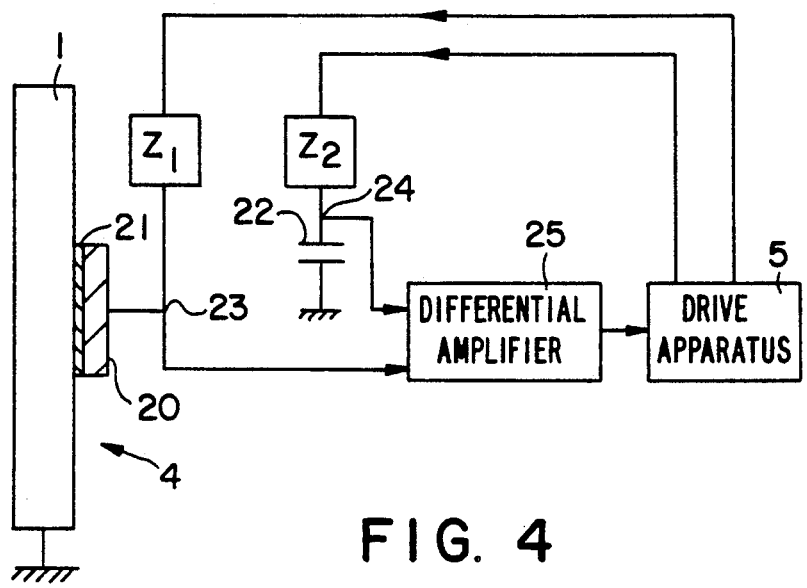
FIG. 4 illustrates a vibration control apparatus in accordance with the preset invention.

FIG. 4 is a block diagram that shows an example of this invention, wherein parts that are identical with parts already discussed for prior technology are given the same numbers. Here vibrator 4 is constructed by adhering a single piezoelectric element 20 to one surface of vibration member 4 having a resonance point by means of adhesive layer 21. Drive apparatus 5 is attached to this piezoelectric element 20 by means of impedance element $Z_1$ and this drive apparatus 5 is also connected to capacitive element 22 by means of another impedance element $Z_2$, so that the output of drive apparatus 5 can be supplied both to piezoelectric element 20 and to capacitive element 22.

Here also connection 23 between piezoelectric element 20 and impedance element $Z_1$ and connection 24 between impedance element $Z_2$ and capacitive element 22 are both connected to differential amplifier 25, and this differential amplifier 25 is in turn connected to drive apparatus 5. Differential amplifier 25 functions so that it obtains the difference between the outputs from the respective connections 23 and 24 and feeds back the differential output to drive apparatus 5.

Further, in this sort of circuit construction of the respective impedance elements $Z_1$ and $Z_2$ may be of any resistance types, capacitive types or induction types, although it is preferred that they each have the same performance, and the capacitance of capacitive element 22 should be identical to that of piezoelectric element 20.

With such a vibration control apparatus, the voltage output of connection 24 between impedance element $Z_2$ and capacitive element 22 becomes equivalent to the applied alternating current voltage at connection 23 when piezoelectric element 20 is considered as a simple capacitive element, so that the outputs of the two connections 23 and 24 are subtracted at differential amplifier 25 to separate out the voltage produced by the strain of piezoelectric element 20, consequently making it possible to provide stabilized self-induced vibration to vibrator 4 by feeding back the differential output as a feedback signal to drive apparatus 5.

So by following this invention it is possible to have a single piezoelectric element function as an piezoelectric element for both drive and for feedback. It is possible to make the work of adhering the piezoelectric element to the vibration member and consequently the work of assembling the vibrator extremely easy. It is possible to remove the effects on self-induced vibration of the different characteristics of a plurality of piezoelectric elements, and it is possible to greatly reduce the effects on self-induced vibration imparted by variations in the physical forms of a plurality of adhesive layers.

As indicated above, the inventive vibrator and associated control apparatus may be incorporated in a gyro.

Figure 5:
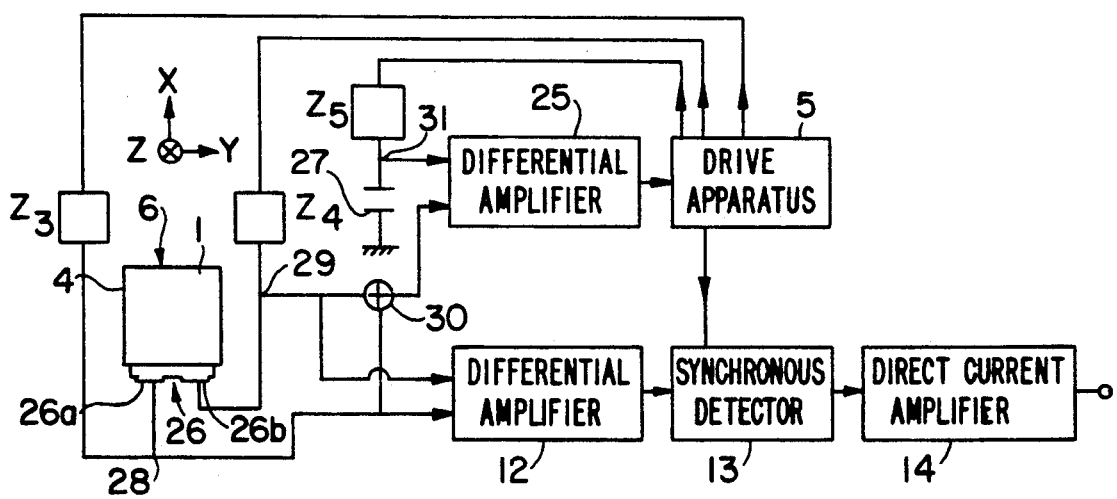
FIG. 5, FIG. 6, FIG. 7, FIG. 8, FIG. 9 and FIG. 10 illustrate gyros in accordance with the present invention.

FIG. 5 is a block diagram of an example of a gyro according to the invention, wherein portions that are identical to portions shown for prior technology in the drawings have the same numbers.

In this example of an embodiment, vibrator 4 is constructed by adhering a single piezoelectric element 26 to one surface of the vibration member 1 which has a rectangular shape in cross-section. The electrode of this piezoelectric element 26 is split along the width of vibration member 1 to make split electrodes 26a and 26b.

Further, the entire piezoelectric element 26 can be split instead of just the electrode.

Here drive apparatus 5 is connected to split electrodes 26a and 26b via the respective impedance elements $Z_3$ and $Z_4$. The drive apparatus is also connected to capacitive element 27 via another impedance element $Z_5$, and these are all capable of receiving alternating current voltage from drive apparatus 5.

The voltage at the connections 28 and 29 between the split electrodes 26a and 26b and impedance elements $Z_3$ and $Z_4$ are added at adder 30. Then at differential amplifier 25 the output from adder 30 and the output from connection 31 between impedance element 25 and capacitive element 27 are differentially amplified, the result being fed back to drive apparatus 5. It is also possible to use any of resistance types, capacitive types or induction types as the said several impedance elements $Z_3$, $Z_4$ and $Z_5$. Further, the two connections 28 and 29 are connected to differential amplifier 12 and this differential amplifier 12 is connected in succession to synchronous detector 13 and direct current amplifier 14 in the same manner as in prior technology.

When a vibration gyro is constructed as above, it is possible to impart self-induced vibration in the X axis direction to vibrator 4 by means of impressing an alternating current voltage from drive apparatus 5 onto split electrodes 26a and 26b. Under such vibration conditions, the outputs from the respective connections 28 and 29 are each the combined output of the supply voltage from drive apparatus 5 and the voltage output via the respective split electrode 26a and 26b from the strain of piezoelectric element 26. Consequently, these combined voltages, after being added by adder 30, are processed by differential amplifier 25 so as to obtain only the voltage created by the vibration in the X axis direction, and when this is fed back to drive apparatus 5 it is possible to stabilize the self-induced vibration of vibrator 4 sufficiently.

Under such self-induced vibration of vibrator 4, when this vibrator 4 is rotated around axis Z, a vibration in the Y axis direction is created in vibrator 4 based on the Coriolis force, and this creates a difference in the output voltages of connections 28 and 29. Here the two output voltages are differentially amplified at differential amplifier 12 to make it possible to do separation detection of the voltage accompanying the formation of the Coriolis force.

Figure 6:
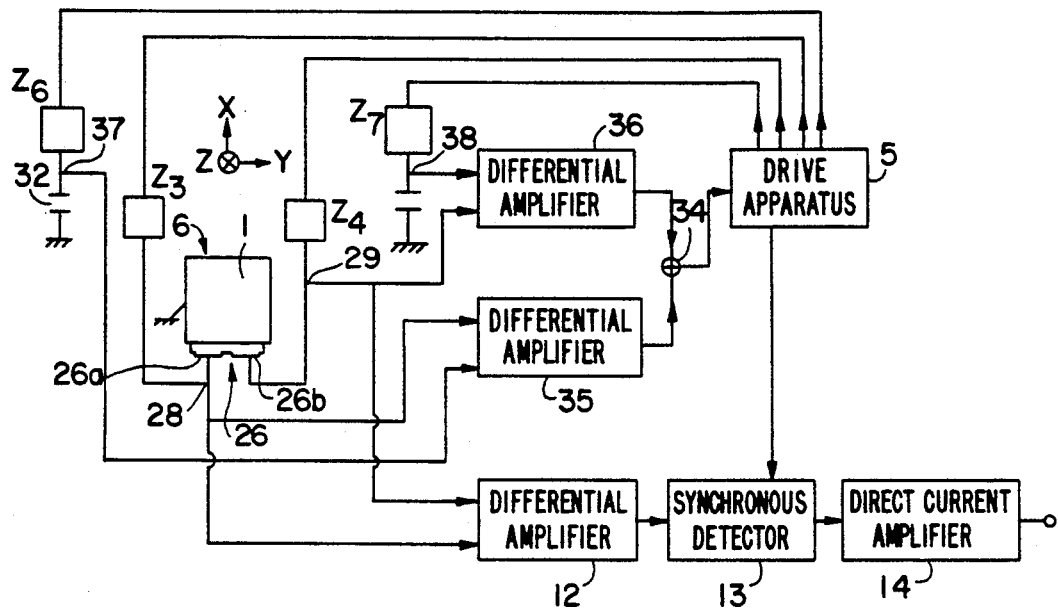

FIG. 6 is a block diagram showing another example of a gyro which incorporates a vibration control apparatus of this invention.

In this example, drive apparatus 5 is connected to the respective split electrodes 26a and 26b via the respective impedance elements $Z_3$ and $Z_4$. The drive apparatus 5 is also connected to the respective capacitive elements 32 and 33 via the other respective impedance elements $Z_6$ and $Z_7$. The respective connections 28 and 29 are connected to adder 34 via the respective differential amplifiers 35 and 36 that differentially amplify with respect to a reference alternating current voltage.

Differential amplifier 35 differentially amplifies the output of impedance element $Z_6$ from connection 37 and the output impedance element $Z_3$ from connection 28. The differential amplifier 36 differentially amplifies the outputs of impedance element $Z_7$ from connection 38 and impedance element $Z_4$ from connection 29. Thus, adder 34 separates out only the voltage generated by the vibration of vibrator 4 in the X axis direction by means of adding these two differential amplification outputs, so that the detection voltage is fed back to drive apparatus 5 to give stabilized self-induced vibration to vibrator 4.

With such a vibration gyro, the Coriolis force occurring during vibration of vibrator 4 can be separated and detected by inputting the respective outputs of connections 28 and 29 into another differential amplifier 12.

Further, although in the foregoing, the outputs of connections 28 and 29 are input directly into differential amplifier 12, it is possible to input the outputs from the respective differential amplifiers 35 and 36 into differential amplifier 12.

Also, in either of the examples in FIG. 5 and FIG. 6 it is possible to have a vibration member 1 with a cross-section in a polygon shape other than rectangular.

As will be clear from what was said above, in the embodiments of FIGS. 5 and 6, this invention makes it possible to provide stabilized self-induced vibration merely by furnishing a single piezoelectric element on one surface of the vibration member without furnishing a special feedback piezoelectric element, and also makes it possible to detect angular velocity with high precision. That is, by having a single piezoelectric element perform the three functions of drive, feedback and detection, it becomes possible to decrease the effects of adhesive on drive conditions sufficiently, to effectively control formation of hysteresis in drive conditions when, for example, temperature cycles are present. It is also possible to suppress offset voltage changes to a sufficiently small level. As a result it is possible to provide constantly stabilized self-induced vibration while maintaining high detection precision.

And in addition, because it is possible to construct the vibrator by adhering only a single piezoelectric element to vibration member 1, it is possible to do assembly of the vibrator very quickly and easily.

Figure 7:
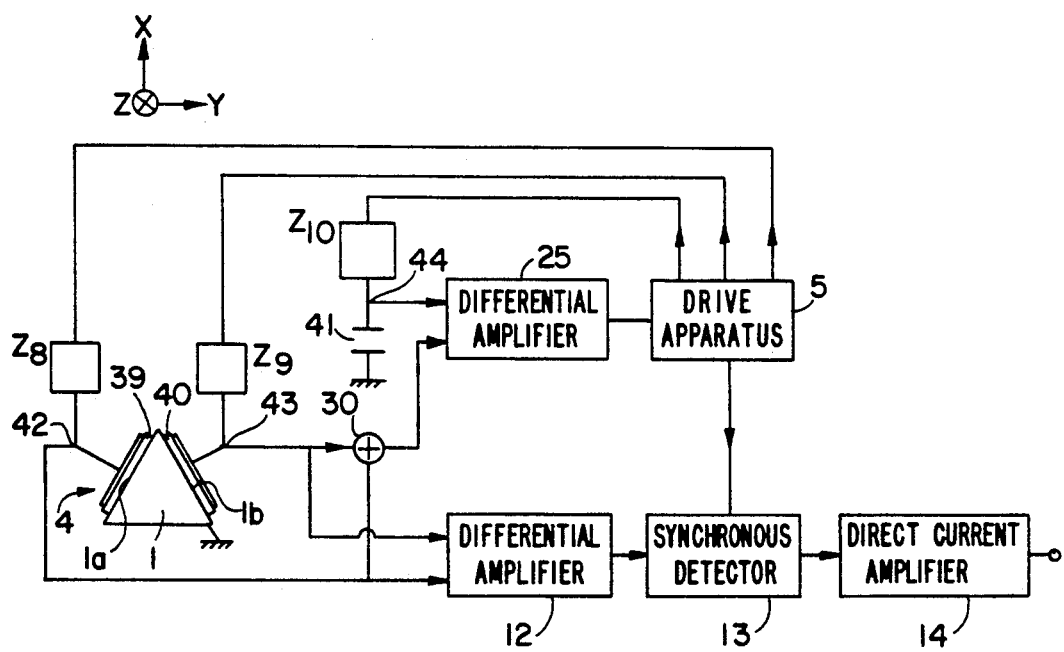

FIG. 7 is a block diagram showing another example of a gyro according to the invention. Those parts that are identical to parts described in the figures for prior technology are shown by identical numbers.

In this example of an embodiment, vibrator 4 is constructed by adhering first piezoelectric element 39 to one surface 1a of vibration member 1 of triangular shape in cross-section while adhering second piezoelectric element 40 to another surface 1b that is adjacent to the surface 1a. The respective piezoelectric elements 39 and 40 are connected to drive apparatus 5 via respective impedance elements $Z_8$ and $Z_9$ while drive apparatus 5 is also connected to capacitive element 41 via another impedance elements $Z_{10}$, so that the alternating current voltage from drive apparatus 5 can be applied simultaneously to piezoelectric elements 39 and 40 and capacitive element 41.

The connections 42 and 43 of the respective piezoelectric elements 39 and 40 and impedance elements $Z_8$ and $Z_9$ are connected to differential amplifier 25 via adder 30. The adder 30 adds the outputs from the two connections 42 and 43. At the differential amplifier 25, the output from adder 30 and output from connection 44, which is between impedance element $Z_{10}$ and capacitive element 41, are differentially amplified and the differential output therefrom is fed back to drive apparatus 5.

It is also possible to use any of resistance types, capacitive types or induction types as the respective impedance elements $Z_8$, $Z_9$ and $Z_{10}$.

Further, connections 42 and 43 between the respective impedance elements $Z_8$ and $Z_9$ and the respective piezoelectric elements 39 and 40 are connected to differential amplifier 12, and this differential amplifier is connected in succession to synchronous detector 13 and direct current amplifier 14 in the same manner as in prior technology.

With a vibration gyro constructed in this manner, vibrator 4 can be given self-induced vibration in the X axis direction by applying alternating current voltage from drive apparatus 5 respectively to piezoelectric elements 39 and 40. In this vibration state, the outputs from the respective connections 42 and 43 become a composite output including as components both the supply voltage from drive apparatus 5 and the voltage output from piezoelectric elements 39 and 4 accompanying the strains in the respective piezoelectric elements 39 and 40. Consequently these two combined outputs, after being added at adder 30, pass through differential amplifier 25 so that only the voltage generated from piezoelectric elements 39 and 40 based on vibration in the X axis direction is extracted, and when this is fed back to drive apparatus 5 it is possible to stabilize the self-induced vibration of vibrator 4 sufficiently.

Under such self-induced vibration in vibrator 4, when vibrator 4 is rotated around the Z axis, a vibration in the Y axis direction is created in vibrator 4 based on the Coriolis force, and this brings about a difference in the output voltages of connections 42 and 43. By differentially amplifying these two output voltages at differential amplifier 12, it is possible to separate and detect the voltages that accompany the Coriolis force.

Figure 8:
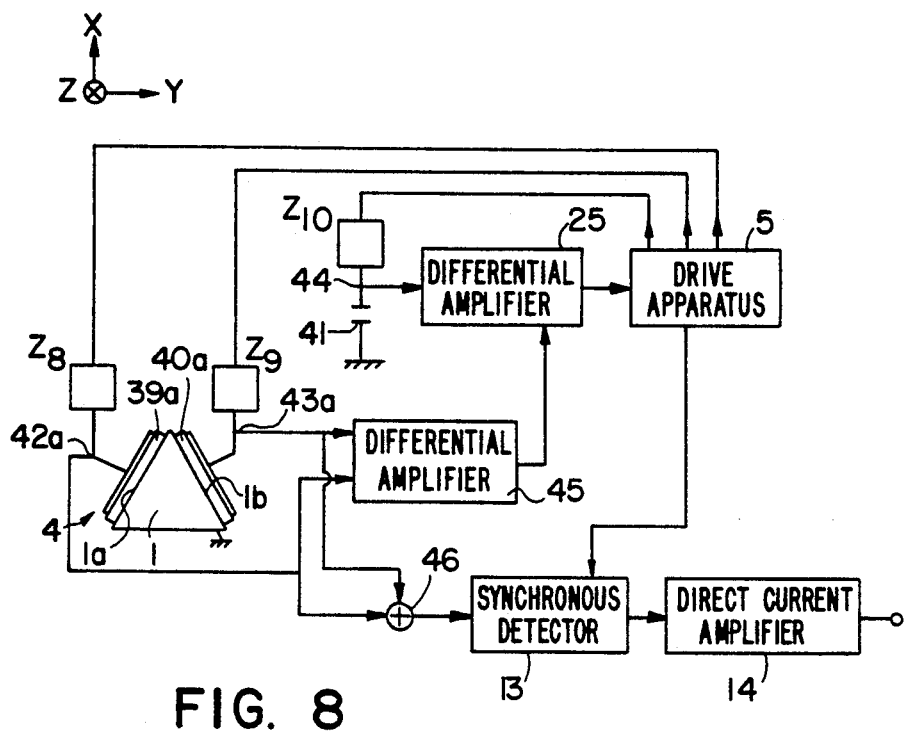

The device of FIG. 8 is a modification of the example shown in FIG. 7, where the polarization directions of piezoelectric elements 39a and 40a adhered respectively to side surfaces 1a and 1b of vibration element 1 are the reverse of what is shown in FIG. 7, so that the strain and output voltage are mutually reversed between piezoelectric elements 39a and 40a. Consequently, the differential amplification of the respective outputs of connections 42a and 43a through use of the differential amplifier 45 has the same meaning as the adder 30 shown in the example in FIG. 7, and the adding of their outputs by the adder 46 has the same meaning as the differential amplification (by differential amplifier 12) in FIG. 7.

Because of this, connections 42a and 43a between the respective impedance elements $Z_8$ and $Z_9$ and the respective piezoelectric elements 39a and 40a are connected to differential amplifier 45 that differentiates between the outputs from these connections 42a and 43a. The differential amplifier 45 is connected to drive apparatus 5 via differential amplifier 25 that differentiates between the output of amplifier 45 and a reference alternating current voltage at the connection 44. The two connections 42a and 43a are also connected to synchronous detector 13 via adder 46. Also, each of the drive voltages supplied to the respective piezoelectric elements 39a and 40a have their directional phases reversed by 180 degrees.

It is a matter of course that the identical action described in regard to FIG. 7 will be obtained by vibration gyro of FIG. 8 as well.

Figure 9:
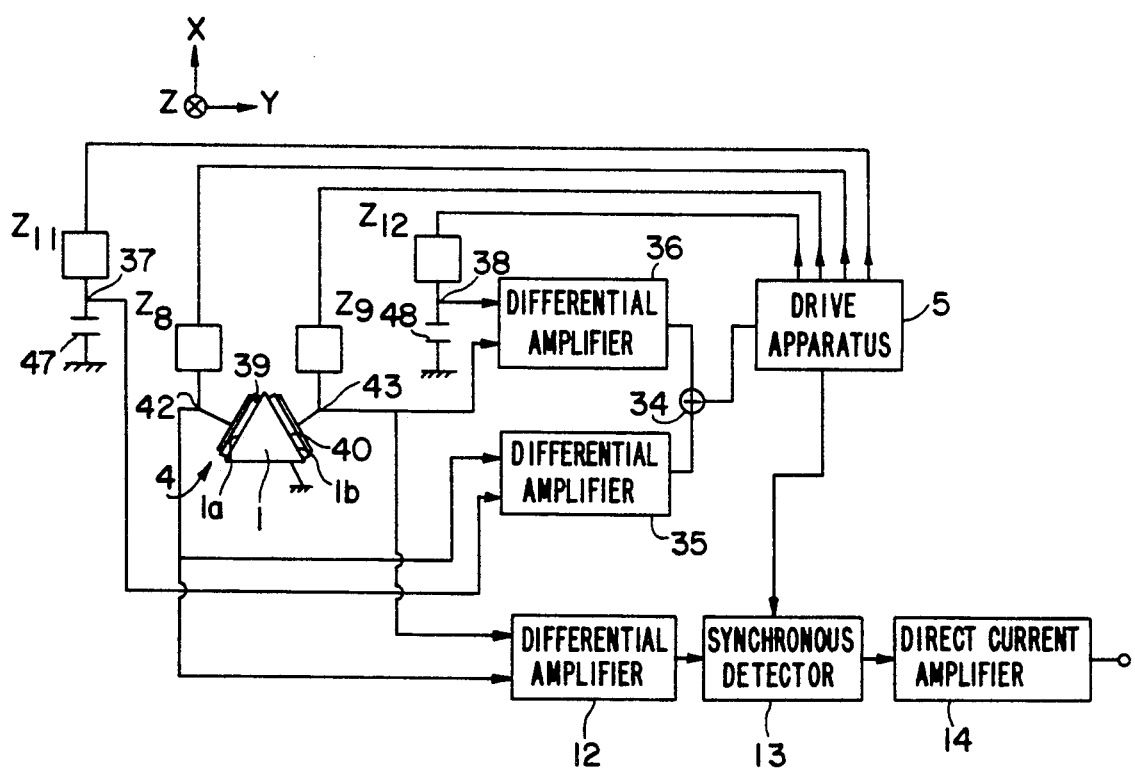

FIG. 9 is a block diagram showing another example of this invention.

This example has drive apparatus 5 connected to the respective piezoelectric elements 39 and 40 via the respective impedance elements $Z_8$ and $Z_9$, while the drive apparatus 5 is also connected to capacitive elements 47 and 48 respectively by other impedance elements $Z_{11}$ and $Z_{12}$, and differs from the example shown in FIG. 7 in that these respective connections 42 and 43 are connected to adder 34 via respective differential amplifiers 35 and 36. The differential amplifiers 35 and 36 differentiate between the voltages at the connections 42 and 43 and first and second reference alternating current voltages.

Here differential amplifier 35 differentially amplifies the output from the connection 37 between impedance element $Z_{11}$ and capacitive element 47 and the output from connection 42, and differential amplifier 36 differentially amplifies the outputs from connection 38 between impedance element $Z_{12}$ and capacitive element 48 and the output from connection 43. Also adder 34 separates and detects only the voltage generated by the X axis direction vibration of vibrator 4 by means of adding these two differential amplification outputs and feeds the detection voltage back to drive apparatus 5 so that vibrator 4 is given a stabilized self-induced vibration.

With this type of vibration gyro, the Coriolis force during rotation of vibrator 4 can be separated and detected by differential amplification after inputting the respective outputs of connections 42 and 43 to another differentiation amplifier 12.

Figure 10:
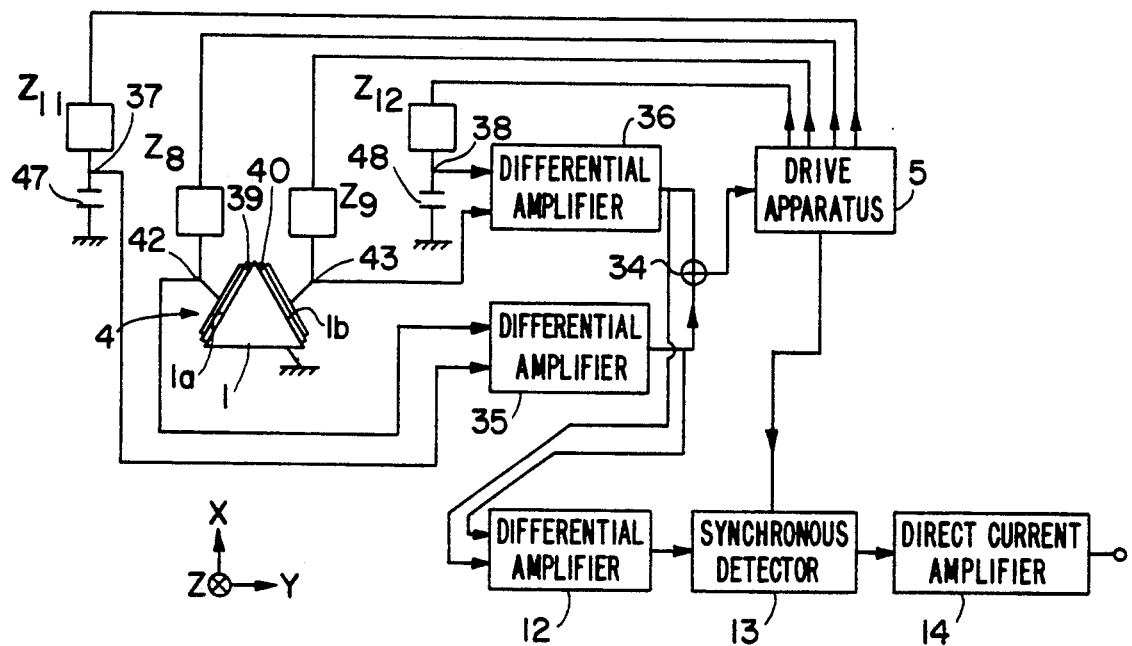

Further, although it was said above that the outputs of connections 42 and 43 are directly inputted to differential amplifier 12, it is also possible to input the outputs from the respective differential amplifiers 35 and 36 into differential amplifier 12 to detect the Coriolis force and therefore the angular velocity in the same manner as shown in FIG. 10 Further, with this invention it is also possible to use any polygon shape other than triangular in the cross-section of vibrator 1.

As will be apparent from what was said above, in the embodiments of FIGS. 7, 8 and 9, the present invention furnishes piezoelectric elements on two surfaces of a vibration element that are not mutually parallel and thereby makes it possible to provide stabilized self-induced vibration constantly without furnishing a separate feedback piezoelectric element and also to detect the angular velocity with high precision. That is, by having the three functions of drive, feedback and detection carried out in one pair of piezoelectric elements, it is possible to decrease the effect of the adhesive on drive conditions sufficiently, to suppress effectively the formation of hysteresis in drive conditions when there are, for example, temperature cycles, and to make changes in offset voltage sufficiently small, so that as a result there is a constantly stabilized self-induced vibration while maintaining high precision in detection.

In addition, assembly of the vibrator can be accomplished very quickly and easily because the vibrator can be constructed with only one pair of piezoelectric elements adhered to vibrator 1.

Finally, the above-described embodiments of the invention are intended to be illustrative only. Numerous alternative embodiments may be desired by those skilled in the art without departing from the scope of the following claims.

What is claimed is:

1. Vibration control apparatus comprising
a vibration member having a surface with a resonance point,
a first piezoelectric element adhered to said surface of said vibration member,
an excitation circuit including a drive apparatus for exciting said piezoelectric element with a first A.C. drive voltage, said drive apparatus being connected to said piezoelectric element via a first excitation circuit impedance element, and
a feedback circuit comprising differential means for obtaining the difference between a voltage at the output of said first excitation circuit impedance element and a first AC reference voltage and for feeding back the difference to said drive apparatus to control said drive apparatus, and
a reference voltage circuit for obtaining said first AC reference voltage comprising a first reference voltage circuit impedance element connected to said drive apparatus and a first capacitor connected to said first reference voltage circuit impedance element, said first AC reference voltage being obtained at the output of said first reference voltage circuit impedance element.

2. The vibration control apparatus of claim 1 wherein said apparatus is incorporated in a gyro and includes means for generating an output indicative of an angular velocity of the vibration member.

3. The vibration control apparatus of claim 2 wherein said vibration member has a polygon-shaped cross-section.

4. The vibration control apparatus of claim 1 wherein said piezoelectric element has an electrode which is split in the direction of vibration member width into first and second electrodes, and wherein said first and second electrodes are connected via said first excitation circuit impedance element and a second excitation circuit impedance element, respectively, to said drive apparatus.

5. The vibration control apparatus of claim 4 wherein said feedback circuit further includes means for obtaining the sum of the voltages present at the outputs of said first and second excitation circuit impedance elements, and wherein said differential means obtains the difference between the sum and said first A.C. reference voltage.

6. A vibration control apparatus comprising
a vibration member having a surface with a resonance point,
a piezoelectric element with a polygon-shaped cross section adhered to said surface of said vibration member, said piezoelectric element having an electrode which is split into first and second electrodes,
an excitation circuit including a drive apparatus for exciting said piezoelectric element with an AC drive voltage, said drive apparatus being connected to said first electrode of said piezoelectric element via a first excitation circuit impedance element and to said second electrode of said piezoelectric element via a second excitation circuit impedance element,
a feedback circuit comprising first differential means for differentiating between a first voltage present at an output of said first excitation circuit impedance element and first AC reference voltage and second differential means for differentiating between an output of said second excitation circuit impedance element and a second AC reference voltage, and means for summing the outputs of said first and second differential means and feeding the result back to said drive apparatus to control said drive apparatus,
said apparatus being incorporated in a gyro and including means for generating an output indicative of an angular velocity of the vibration member.

7. The apparatus of claim 6 further comprising first and second reference voltage circuits for generating said first and second reference voltages, said first reference voltage circuit comprising a first reference voltage circuit impedance element connected to said drive apparatus and a first capacitor connected to said first reference voltage circuit impedance element, said second reference voltage circuit comprising a second reference voltage circuit impedance element connected to said drive apparatus and a second capacitor connected to said second reference voltage circuit impedance element.

8. Vibration control apparatus comprising
a vibration member having a surface with a resonance point, said vibration member having a polygon-shaped cross-section with first and second non-parallel surfaces,
first and second piezoelectric elements adhered to said first and second non-parallel surfaces,
an excitation circuit including a drive apparatus for exciting said piezoelectric elements with first and second AC drive voltages, said drive apparatus being connected to said first piezoelectric element via a first excitation circuit impedance element and to said second piezoelectric element via a second excitation circuit impedance element,
a feedback circuit responsive to the outputs of said first and second excitation circuit impedance elements and for feeding back a voltage which is differentiated with respect to an AC reference voltage to said drive apparatus to control said drive apparatus,
said vibration control apparatus being incorporated in a gyro and including means for generating an output indicative of an angular velocity of the vibration member.

9. The vibration control apparatus of claim 8 wherein said feedback circuit further comprises summing means for summing a first voltage obtained at an output of said first excitation circuit impedance element and a second voltage obtained at an output of said second excitation circuit impedance element, and means for differentiating the output voltage of the summing means and an A.C. reference voltage and for feeding back the result to said drive apparatus, said vibration control apparatus also including means for differentiating between the first and second voltages to obtain said output indicative of angular velocity.

10. The vibration control apparatus of claim 8 further including a reference voltage circuit for generating said A.C. reference voltage comprising a reference voltage circuit impedance element connected to said drive apparatus and a capacitor connected to said reference voltage circuit impedance element.

11. Vibration control apparatus comprising
a vibration member having a surface with a resonance point, said vibration member having a polygon-shaped cross-section with first and second non-parallel surfaces,
first and second piezoelectric elements adhered to said first and second non-parallel surfaces,
an excitation circuit including a drive apparatus for exciting said piezoelectric elements with first and second AC drive voltages, said drive apparatus being connected to said first piezoelectric element via a first excitation circuit impedance element and to said second piezoelectric element via a second excitation circuit impedance element,
a feedback circuit responsive to the outputs of said first and second excitation circuit impedance elements and for feeding back a voltage to said drive apparatus to control said drive apparatus,
said vibration control apparatus being incorporated in a gyro and including means for generating an output indicative of an angular velocity of the vibration member,
wherein said feedback circuit comprises first differential means for differentiating between a first voltage obtained at an output of said first excitation circuit impedance element and a second voltage obtained at an output of said second excitation circuit impedance element, a second differential means for differentiating between the output of said first differential means and an A.C. reference voltage and for feeding the result back to said drive apparatus, said vibration control apparatus further including a summer for summing said first and second voltages to obtain said output indicative of angular velocity.

12. The vibration control apparatus of claim 11 comprising a reference voltage circuit for generating said A.C. reference voltage comprising a reference voltage circuit impedance element connected to said drive apparatus and a capacitor connected to said reference voltage circuit impedance element.

13. Vibration control apparatus comprising
a vibration member having a surface with a resonance point, said vibration member having a polygon-shaped cross-section with first and second non-parallel surfaces,
first and second piezoelectric elements adhered to said first and second non-parallel surfaces,
an excitation circuit including a drive apparatus for exciting said piezoelectric elements with first and second AC drive voltages, said drive apparatus being connected to said first piezoelectric element via a first excitation circuit impedance element and to said second piezoelectric element via a second excitation circuit impedance element,
a feedback circuit responsive to the outputs of said first and second excitation circuit impedance elements and for feeding back a voltage to said drive apparatus to control said drive apparatus,
said vibration control apparatus being incorporated in a gyro and including means for generating an output indicative of an angular velocity of the vibration member;
wherein said feedback circuit comprises first differential means for differentiating between a first voltage obtained at an output of said first excitation circuit impedance element and a first A.C. reference voltage, second differential means for differentiating between a second voltage obtained at an output of said second excitation circuit impedance element and a second A.C. reference voltage, and means for adding the outputs of said first and second differential means and feeding back the result to said drive apparatus, said vibration control apparatus also including third differential means for differentiating between said first and second voltages to obtain said output indicative of angular velocity.

14. The vibration control apparatus of claim 13 comprising first and second reference voltage circuits for generating said first and second reference voltages, said first and second reference voltage circuits, respectively, comprising first and second reference voltage circuit impedance elements connected to said drive apparatus, and first and second capacitors, connected to said first and second reference voltage circuit impedance elements, respectively.

15. Vibration control apparatus comprising
a vibration member having a surface with a resonance point, said vibration member having a polygon-shaped cross-section with first and second non-parallel surfaces,
first and second piezoelectric elements adhered to said first and second non-parallel surfaces,
an excitation circuit including a drive apparatus for exciting said piezoelectric elements with first and second AC drive voltages, said drive apparatus being connected to said first piezoelectric element via a first excitation circuit impedance element and to said second piezoelectric element via a second excitation circuit impedance element,
a feedback circuit responsive to the outputs of said first and second excitation circuit impedance elements and for feeding back a voltage to said drive apparatus to control said drive apparatus,
said vibration control apparatus being incorporated in a gyro and including means for generating an output indicative of an angular velocity of the vibration member,
wherein said feedback circuit comprises first differential means for differentiating between a first voltage obtained at an output of said first excitation circuit impedance element and a first A.C. reference voltage and a second differential means for differentiating between a second voltage obtained at an output of said second excitation circuit impedance element and a second A.C. reference voltage, and summing means for summing the outputs of said first and second differential means and feeding the result back to the drive apparatus, said vibration control apparatus further comprising third differential means for differentiating between the outputs of said first and second differential means to obtain said output indicative of angular velocity.

16. The vibration control apparatus of claim 15 comprising first and second reference voltage circuits for generating said first and second reference voltages, said first and second reference voltage circuits, respectively, comprising first and second reference voltage circuit impedance elements connected to said drive apparatus, and first and second capacitors, connected to said first and second reference voltage circuit impedance elements, respectively.

* * * * *